US008916258B2

(12) United States Patent
Bauchot et al.

(10) Patent No.: US 8,916,258 B2
(45) Date of Patent: Dec. 23, 2014

(54) DISPLAY APPARATUS

(75) Inventors: Frederic Bauchot, Saint-Jeannet (FR); Flemming Boegelund, Frederikssund (DK)

(73) Assignee: International Business Machines Corporation, Armonk, NY (US)

( * ) Notice: Subject to any disclaimer, the term of this patent is extended or adjusted under 35 U.S.C. 154(b) by 1310 days.

(21) Appl. No.: 12/260,467

(22) Filed: Oct. 29, 2008

(65) Prior Publication Data

US 2009/0117347 A1 May 7, 2009

(30) Foreign Application Priority Data

Nov. 7, 2007 (EP) .................................. 07301529

(51) Int. Cl.
*B32B 3/10* (2006.01)
*G01K 5/48* (2006.01)
*G01F 23/00* (2006.01)
*G01K 5/62* (2006.01)
*G01D 7/00* (2006.01)

(52) U.S. Cl.
CPC *G01K 5/48* (2013.01); *G01F 23/00* (2013.01); *G01K 5/62* (2013.01); *G01D 7/00* (2013.01)
USPC ..................................................... 428/195.1

(58) Field of Classification Search
USPC ..................................................... 428/195.1
See application file for complete search history.

(56) References Cited

U.S. PATENT DOCUMENTS 1,172,360 A * 2/1916 Hildburgh ...................... 40/437

FOREIGN PATENT DOCUMENTS

| EP | 0126983 A1 | 12/1984 | ............... G01K 5/32 |
| JP | 2006194366 | 7/2006 | ............... F16T 1/48 |

OTHER PUBLICATIONS

Machine translation of Essign et al., EP0126983A1.*

* cited by examiner

*Primary Examiner* — Mark Ruthkosky
*Assistant Examiner* — Ian Rummel
(74) *Attorney, Agent, or Firm* — DeLizio Gilliam, PLLC

(57) ABSTRACT

A display apparatus that includes a mask layer composed of transparent portions and opaque portions, the mask layer being superimposed over a pattern layer comprising light portions and dark portions. The mask layer can be moved relative to the pattern layer between a first position, whereby certain portions on the pattern layer are selectively obscured, and a second position whereby other portions on the pattern layer are selectively obscured. The mask layer can be moved relative to the second level by the movement of an actuating member coupled thereto as a function of ambient physical conditions. The ambient conditions may include, for example, temperature, pressure, humidity, acidity, voltage, fill level and the like.

20 Claims, 9 Drawing Sheets

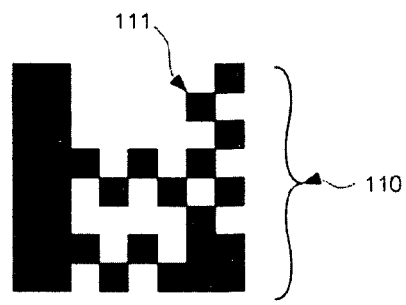
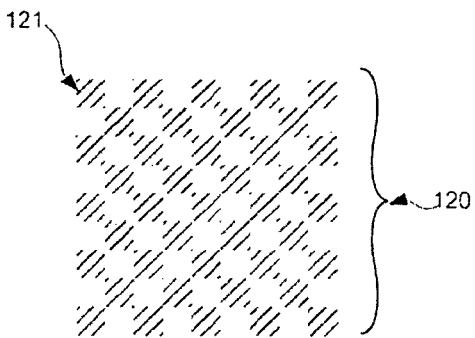
*Fig 1a*  *Fig 1b*
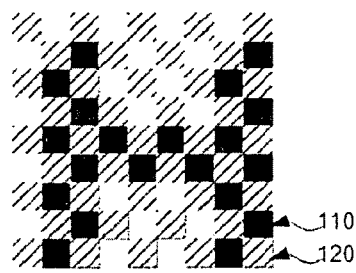 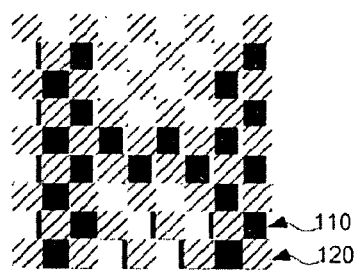 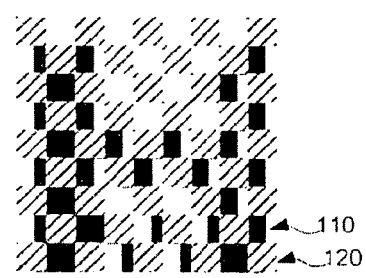
*Fig 1c*  *Fig 1d*  *Fig 1e*
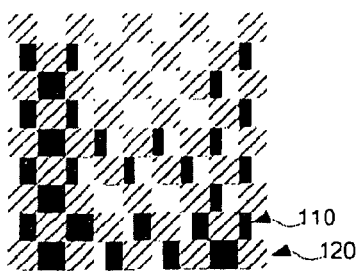 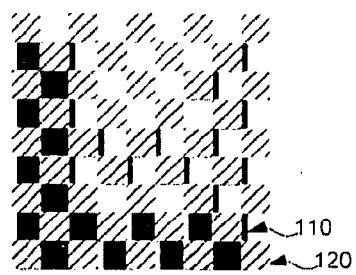 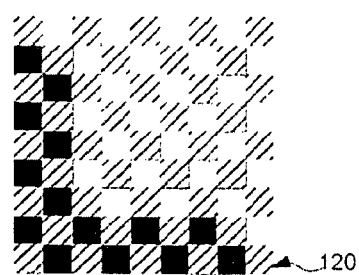
*Fig 1f*  *Fig 1g*  *Fig 1h*

DISPLAY APPARATUS

CROSS-REFERENCE TO FOREIGN APPLICATION

This patent claims the benefit of the priority date of a prior foreign application filed under 35 U.S.C. §119, namely counterpart European Patent Application No. EP07301529.9, entitled "Display Apparatus" which was filed on Nov. 7, 2007. The foreign application is incorporated herein by reference in its entirety.

FIELD OF THE INVENTION

The present invention relates to a display apparatus suitable for indicating ambient physical conditions.

BACKGROUND OF THE INVENTION

In many industrial, domestic or other situations, it is desirable to present a clear message concerning ambient physical conditions. Such physical conditions may include temperature, pressure, and humidity. It is desirable to convert detected values into a form that is readily comprehensible to a human viewer.

JP2006194366A2 discloses a temperature indicator for use with water pipes with a low temperature and high temperature display connected to either end of a movable component that is connected to temperature reaction component inside a case. The temperature indicator comprises a case attached to an object to be measured; a temperature responsive actuating member of which one end side is attached to the inside of the case and which is contracted or expanded depending on temperature change. The indicator further comprises a movable actuating member attached to the other end side of the temperature responsive actuating member and displaced in the axial center direction of the case by contraction or extension of the temperature responsive actuating member; a low-temperature display part attached to one end side of the movable actuating member, and protruded from the case when the temperature becomes below predetermined low temperature. The indicator further comprises a high-temperature display part attached to the other end side of the movable actuating member, and protruded from the case when the temperature exceeds predetermined high temperature. The temperature indicator also comprises a partition wall (excessive expansion preventive member) preventing expansion of the temperature responsive actuating member above a certain level.

EP0126983A1 discloses an encapsulated thermometer. The thermometer comprising an expansion box which acts on one of two connecting rods of a parallelogram linkage and thus moves an indicator plate along the inside of a transparent calibrated lid. The individual temperature regions to be displayed are represented by coloured symbols which form an optical translation of the movement of the pointer.

A drawback of these described approaches is the graphical poverty of the information presented to the viewer and the inherent need to divide the display area as a whole into separate areas for each possible display value.

Other prior art solutions may be based on temperature sensitive liquid crystal pattern. However, these are associated with prohibitive limitations in terms of temperature range, size, etc.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is therefore one aspect of the present invention to provide for a display apparatus.

It is another aspect of the present invention to provide for a display apparatus suitable for indicating ambient physical conditions.

The aforementioned aspects and other objectives and advantages can now be achieved as described herein. A display apparatus is disclosed, which includes a mask layer comprising portions having a first light transmission characteristic and portions having a second light transmission characteristic; and a pattern layer, wherein the mask layer is superimposed over the pattern layer comprising portions of a first light emission characteristic and portions of a second light emission characteristic, wherein the mask layer can be moved relative to the pattern layer between a first position, whereby certain portions on the pattern layer are selectively obscured, and a second position whereby other portions on the pattern layer are selectively obscured, wherein the mask layer is moved relative the second level by the movement of an actuating member coupled thereto as a function of ambient physical conditions.

Advantages exhibited by embodiments of the invention include compatibility with the display of any physical variable which can be mechanically coupled to the device. In the case of temperature detection, the device can function over a wide temperature range. A device of large physical size can also be conceived. Another advantage involves "power free"; that is, a power source is not required. A built-in battery is also not required. The embodiments also exhibit "far distance readable" properties; that is, stringent requirements are not imposed on the reading distance or viewing angle for ensuring a sufficient reading contrast. The device is also inexpensive to manufacture and reversible.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which:

FIG. 1a shows a first exemplary pattern layer;

FIG. 1b shows a first exemplary mask layer;

FIG. 1c shows the mask layer 120 and the pattern layer 110 superimposed in a first configuration;

FIG. 1d shows the mask layer 120 and the pattern layer 110 superimposed in a second configuration;

FIG. 1e shows the mask layer 120 and the pattern layer 110 superimposed in a third configuration;

FIG. 1f shows the mask layer 120 and the pattern layer 110 superimposed in a fourth configuration;

FIG. 1g shows the mask layer 120 and the pattern layer 110 superimposed in a fifth configuration;

FIG. 1h shows the mask layer 120 and the pattern layer 110 superimposed in a sixth configuration;

DETAILED DESCRIPTION

Figure 2A:
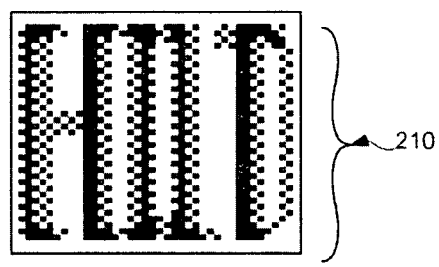
FIG. 2a shows a second exemplary pattern layer.

A display apparatus is provided comprising a mask layer comprising portions having a first light transmission characteristic and portions having a second light transmission characteristic, the mask layer superimposed over a pattern layer comprising portions of a first light emission characteristic and portions of a second light emission characteristic.

FIG. 1*a* shows a first exemplary pattern layer 110. As shown, the pattern layer is comprised of an eight by eight grid, in which certain squares are shaded 111, so as to form an apparently unstructured pattern. As shown, the shaded areas are substantially black and the unshaded areas substantially white. In practice, the unshaded areas may exhibit a reflectivity of greater than 80%, or preferably 90% or still more preferably 99%, at a first visible light wavelength and the shaded areas a reflectivity of a visibly different value. In general, the greater the difference in reflectivity, the clearer the display will be to a human viewer.

FIG. 1*b* shows a first exemplary mask layer 120. As shown, the mask layer is comprised of a nine by nine grid, in which alternating squares are shaded 121, so as to form a chequered pattern. The shaded areas may be considered to be substantially opaque and the unshaded areas substantially transparent, for example, the unshaded areas may exhibit a transmittance of greater than 80%, or preferably 90% or still more preferably 99%, at a first visible light wavelength and the shaded areas a transmittance of less than 20%, or preferably 10% or still more preferably 1%, at the first visible light wavelength. On this basis, the shaded areas need not block all frequencies equally, but may filter selected frequencies. In general, the greater the difference in transmittance of the different portions, the clearer the display will be to a human viewer.

The two layers are superimposed and the mask layer can be moved relative to the pattern layer between a first position whereby certain portions on the pattern layer are selectively obscured and a second position whereby other portions on the pattern layer are selectively obscured.

FIG. 1*c* shows the mask layer 120 and the pattern layer 110 superimposed in a first configuration. The mask layer fully obscures many of the shaded portions of the underlying pattern layer. The shaded portions of the underlying pattern layer that are not obscured form a visible pattern, which in the present example resembles a capital letter "H".

FIG. 1*d* shows the mask layer 120 and the pattern layer 110 superimposed in a second configuration, whereby the mask layer has been moved by a fraction of the width of one square to the right relative to the underlying pattern layer. The mask layer now obscures many of the shaded portions of the underlying pattern layer somewhat less, but other portions which were previously obscured have now become partially visible.

FIG. 1*e* shows the mask layer 120 and the pattern layer 110 superimposed in a third configuration, whereby the mask layer has been moved by a further fraction of the width of one square to the right relative to the underlying pattern layer. The mask layer now obscures many of the shaded portions of the underlying pattern layer still less, but other portions which were previously obscured have now become still more visible.

FIG. 1*f* shows the mask layer 120 and the pattern layer 110 superimposed in a fourth configuration, whereby the mask layer has been moved by a further fraction of the width of one square to the right relative to the underlying pattern layer. The mask layer now obscures many of the shaded portions of the underlying pattern layer still less, but other portions which were previously obscured have now become still more visible.

FIG. 1*g* shows the mask layer 120 and the pattern layer 110 superimposed in a fifth configuration, whereby the mask layer has been moved by a further fraction of the width of one square to the right relative to the underlying pattern layer. The mask layer now obscures many of the shaded portions of the underlying pattern layer still less, but other portions which were previously obscured have now become still more visible.

FIG. 1*h* shows the mask layer 120 and the pattern layer 110 superimposed in a sixth configuration, whereby the mask layer has been moved by a further fraction of the width of one square to the right relative to the underlying pattern layer. The mask layer fully obscures many of the shaded portions of the underlying pattern layer. The shaded portions of the underlying pattern layer that are not obscured form a visible pattern, which in the present example resembles a capital letter "L".

The mask layer is moved relative to the second level by the movement of an actuating member coupled thereto as a function of ambient physical conditions. Examples of such an actuating member include any transducer which may convert variations of a physical condition of interest into mechanical movement. For example, if a temperature sensitive display is required, a bimetallic strip or other such temperature transducer may be used. Similar transducer mechanisms for other physical properties such as pressure, humidity, acidity, voltage, fill level and so on will readily occur to the skilled person.

It will be appreciated that while the actuating member is coupled to the mask layer, this coupling may be by means of the frame or otherwise so that the pattern layer is moved. This effect sought is that the mask layer and pattern layer should move relative to each other.

As described above, the display apparatus offers two configurations which are of meaning to a human viewer (i.e. "H" in the first configuration, and "L" in the sixth configuration). It may easily be imagined that in the case of a display coupled to a temperature sensitive actuating member, the H may be readily understood as signifying a high temperature and the L of signifying a low temperature. As such, in the first position the portions on the pattern layer that are not obscured are visible as one or more meaningful symbols.

It will be appreciated that the number of squares constituting the pattern and mask layers fix the resolution of the visible symbol. In the example of FIG. 1, very low resolution has been used for the sake of simplicity. It will be readily appreciated that by increasing the resolution the legibility of the symbol and the graphical complexity of the symbol may be enhanced.

FIG. 2a shows a second exemplary pattern layer. The pattern layer 210 of FIG. 2a is similar to that of FIG. 1a, except that it is based on a 40 by 40 matrix. It may also be noted that the matrix cells are rectangular rather than square.

Figure 2B:
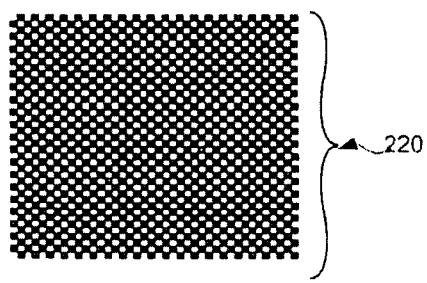
FIG. 2b shows a second exemplary mask layer.

FIG. 2b shows a second exemplary mask layer. The mask layer 220 of FIG. 2b is similar to that of FIG. 1b, except that it is based on a 40 by 40 matrix. It may also be noted that the matrix cells are rectangular rather than square.

Figure 2C:
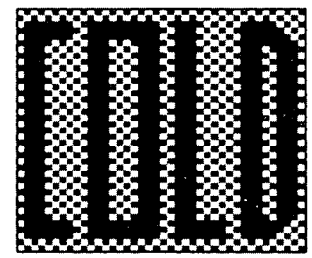
FIG. 2c shows the mask layer 220 and the pattern layer 210 superimposed in a first configuration.

FIG. 2c shows the mask layer 220 and the pattern layer 210 superimposed in a first configuration. The mask layer fully obscures many of the shaded portions of the underlying pattern layer. The shaded portions of the underlying pattern layer that are not obscured form a visible pattern, which in the present example resembles the word "COLD".

Figure 2D:
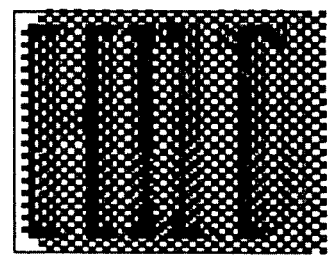
FIG. 2*d* shows the mask layer 220 and the pattern layer 210 superimposed in a second configuration.

FIG. 2d shows the mask layer 220 and the pattern layer 210 superimposed in a second configuration, whereby the mask layer has been moved by a fraction of the width of one square to the right relative to the underlying pattern layer. The mask layer now obscures many of the shaded portions of the underlying pattern layer still less, but other portions which were previously obscured have now become partially visible.

Figure 2E:
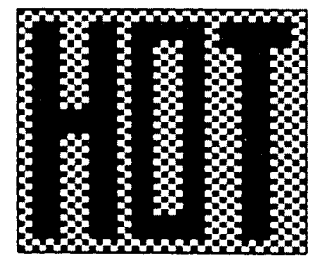
FIG. 2*e* shows the mask layer 220 and the pattern layer 210 superimposed in a third configuration.

FIG. 2e shows the mask layer 120 and the pattern layer 210 superimposed in a third configuration, whereby the mask layer has been moved by a further fraction of the width of one square to the right relative to the underlying pattern layer. The mask layer fully obscures many of the shaded portions of the underlying pattern layer. The shaded portions of the underlying pattern layer that are not obscured form a visible pattern, which in the present example resembles a capital letter "HOT".

It is clear that the enhanced resolution of the example of FIG. 2 enhances the legibility and flexibility of the approach.

Figure 3A:
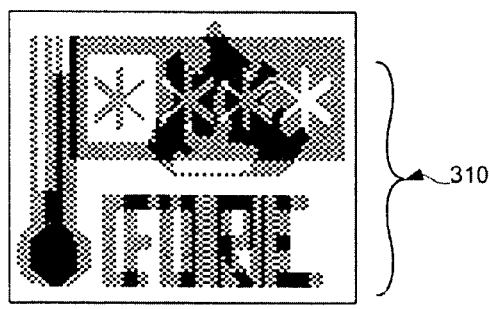
FIG. 3*a* shows a third exemplary pattern layer.

FIG. 3a shows a third exemplary pattern layer. The pattern layer 310 of FIG. 3a is similar to that of FIG. 2a, except that it is based on a 100 by 100 matrix.

Figure 3B:
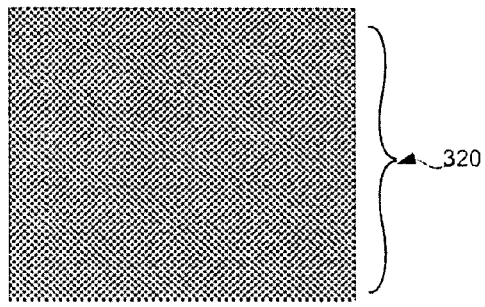
FIG. 3*b* shows a third exemplary mask layer.

FIG. 3b shows a third exemplary mask layer. The mask layer 320 of FIG. 3b is similar to that of FIG. 2b, except that it is based on a 100 by 100 matrix.

Figure 3C:
FIG. 3*c* shows the mask layer 320 and the pattern layer 310 superimposed in a first configuration.

FIG. 3c shows the mask layer 320 and the pattern layer 310 superimposed in a first configuration. The mask layer fully obscures many of the shaded portions of the underlying pattern layer. The shaded portions of the underlying pattern layer that are not obscured form a visible pattern, which in the present example resembles the word "FIRE" together with a graphic representation of flames and a graphic representation of a thermometer with a high mercury level.

Figure 3D:
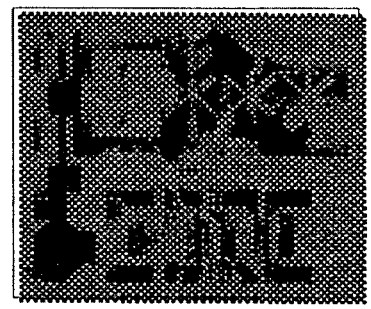
FIG. 3*d* shows the mask layer 320 and the pattern layer 310 superimposed in a second configuration.

FIG. 3d shows the mask layer 320 and the pattern layer 310 superimposed in a second configuration, whereby the mask layer has been moved by a fraction of the width of one square to the right relative to the underlying pattern layer. The mask layer now obscures many of the shaded portions of the underlying pattern layer still less, but other portions which were previously obscured have now become partially visible.

Figure 3E:
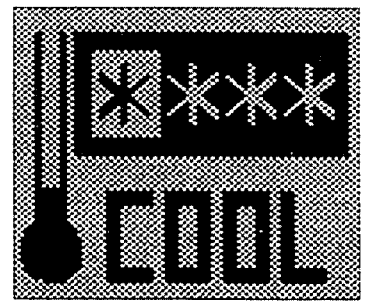
FIG. 3*e* shows the mask layer 320 and the pattern layer 310 superimposed in a third configuration.

FIG. 3e shows the mask layer 320 and the pattern layer 310 superimposed in a third configuration, whereby the mask layer has been moved by a further fraction of the width of one square to the right relative to the underlying pattern layer. The mask layer fully obscures many of the shaded portions of the underlying pattern layer. The shaded portions of the underlying pattern layer that are not obscured form a visible pattern, which in the present example resembles the word "COOL" together with a graphic representation of the standard European 4 star freezer rating symbol indicating a temperature below −19° C. and a graphic representation of a thermometer with a low mercury level.

This example thus demonstrates the possibilities of the present invention with respect to graphic representations of information. Accordingly, in the second position, the portions on the pattern layer that are not obscured are preferably visible as one or more meaningful symbols, which may include alphanumeric characters, graphical symbols, photographic images, bar codes or any other visible pattern.

The number of positions corresponding to discrete views is not limited to two. The mask patterns of FIGS. 1, 2 and 3 all comprise an equal number of shaded and unshaded areas. In other words, the ratio of shaded to unshaded areas is 1:1. By selecting a pattern with a higher proportion of shaded areas, it becomes possible to provide further positions corresponding to discrete views.

Figure 4A:
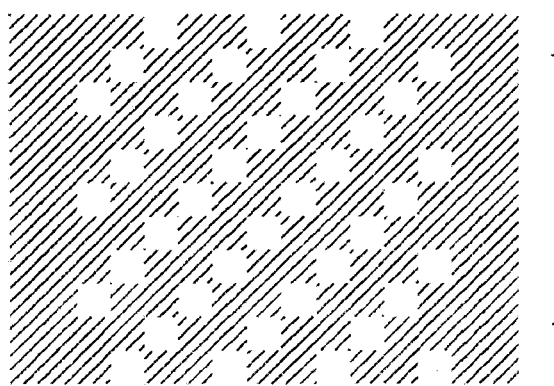
FIG. 4*a* show a mask pattern providing three positions corresponding to discrete views.

FIG. 4a shows a mask layer 420 providing three positions corresponding to discrete views. As shown in FIG. 4a, there is provided a mask layer comprised of an eleven by eleven grid, in which in any given row every second and third square is shaded, so as to form a diagonally striped pattern having a ratio of shaded to unshaded areas is 2:1. As shown, in addition to the eleven by eleven grids, blanking margins can be provided, each two cells wide on the left and right hand sides of the grid.

Figure 4B:
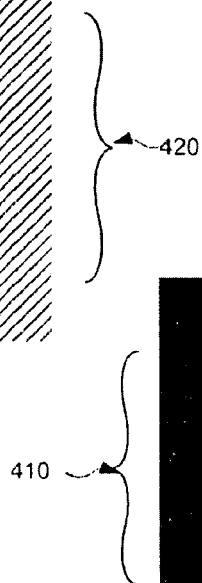
FIG. 4*b* shows an exemplary pattern compatible with the mask layer of FIG. 4*a*.

FIG. 4b shows an exemplary pattern layer 410 compatible with the mask layer 420 of FIG. 4a. As shown, the pattern layer is comprised of an eleven by eleven grid, in which certain squares are shaded, so as to form an apparently unstructured pattern.

As indicated above, the mask layer 420 of FIG. 4a and the pattern layer 410 of FIG. 4b can be superimposed in three positions which provide discrete recognizable images.

Figure 4C:
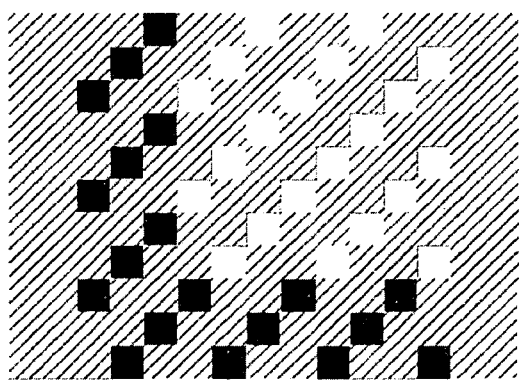
FIG. 4*c* shows the mask layer 420 and the pattern layer 410 superimposed in a first configuration.

FIG. 4c shows the mask layer 420 and the pattern layer 410 superimposed in a first configuration. The mask layer fully obscures many of the shaded portions of the underlying pattern layer. The shaded portions of the underlying pattern layer that are not obscured form a visible pattern, which in the present example resembles the character "L".

Figure 4D:
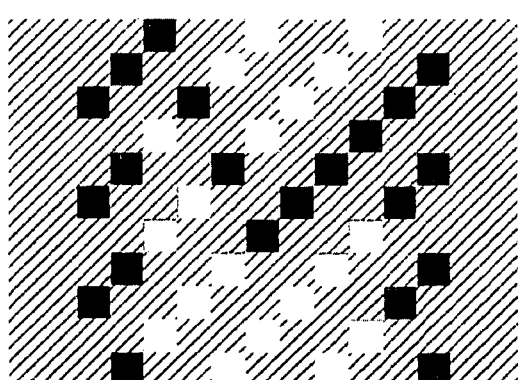
FIG. 4*d* shows the mask layer 420 and the pattern layer 410 superimposed in a second configuration.

FIG. 4d shows the mask layer 420 and the pattern layer 410 superimposed in a second configuration. To arrive at this second configuration, the mask layer has been displaced by the width of one cell or square to the left relative to the pattern layer from its starting point as shown in FIG. 4c. The mask layer fully obscures many of the shaded portions of the underlying pattern layer. The shaded portions of the underlying pattern layer that are not obscured form a visible pattern, which in the present example resembles the character "M".

Figure 4E:
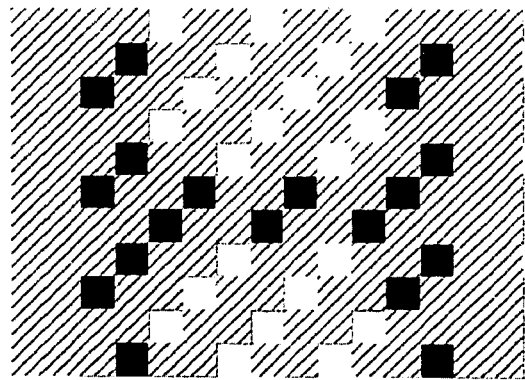
FIG. 4*e* shows the mask layer 420 and the pattern layer 410 superimposed in a third configuration.

FIG. 4e shows the mask layer 420 and the pattern layer 410 superimposed in a third configuration. To arrive at this third configuration, the mask layer has been displaced by the width of two cells or squares to the left relative to the pattern layer from its starting point as shown in FIG. 4c. The mask layer fully obscures many of the shaded portions of the underlying pattern layer. The shaded portions of the underlying pattern layer that are not obscured form a visible pattern, which in the present example resembles the character "H".

One might easily imagine that in certain embodiments the letters "L", "M" and "H" may be interpreted as signifying "Low", "Medium" and "High". Any repeating pattern having the requisite ratio may be adopted for the mask layer.

It will be appreciated that each cell need not be entirely filled in. By superimposing a mask as described above on any set of background patterns, a pattern layer may be generated in which the symbols have curved edges, or lines which do not follow the cell edges.

Figure 5A:
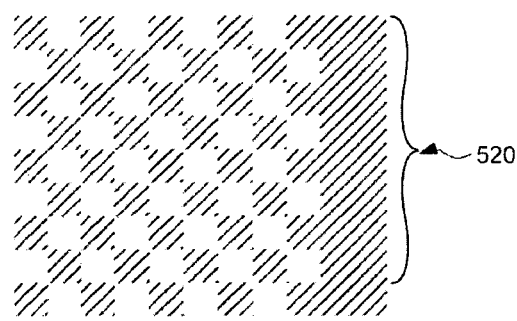
FIG. 5*a* shows a fifth exemplary mask pattern.

FIG. 5a shows a fifth exemplary mask layer 520. As shown in FIG. 5a, there is provided a mask layer comprised of a nine by nine grid shaded in a chequered pattern. As shown, in addition to the nine by nine grids, there is provided a blanking margins two cells wide on the right hand side of the grid.

Figure 5B:
FIG. 5*b* shows an exemplary pattern compatible with the mask layer of FIG. 5*a*.

FIG. 5b shows an exemplary pattern layer 510 compatible with the mask layer of FIG. 5a. As shown, the pattern layer is comprised of a nine by nine grid, in which certain squares are fully or partially shaded, so as to form an apparently unstructured pattern.

As indicated above, the mask layer 520 of FIG. 5a and the pattern layer 510 of FIG. 5b can be superimposed in three positions which provide discrete recognisable images.

Figure 5C:
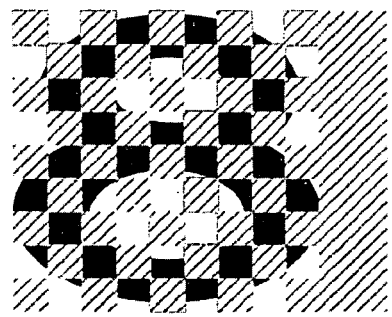
FIG. 5*c* shows the mask layer 520 and the pattern layer 510 superimposed in a first configuration.

FIG. 5c shows the mask layer 520 and the pattern layer 510 superimposed in a first configuration. The mask layer fully obscures many of the shaded portions of the underlying pattern layer. The shaded portions of the underlying pattern layer that are not obscured form a visible pattern, which in the present example resembles the character "8".

Figure 5D:
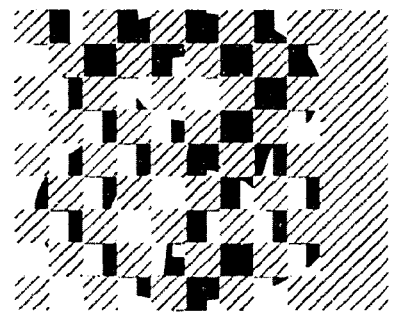
FIG. 5*d* shows the mask layer 520 and the pattern layer 510 superimposed in an intermediate configuration.

FIG. 5d shows the mask layer 520 and the pattern layer 510 superimposed in an intermediate configuration, whereby the mask layer has been moved by a fraction of the width of one square to the right relative to the underlying pattern layer. The mask layer now obscures many of the shaded portions of the underlying pattern layer still less, but other portions which were previously obscured have now become partially visible.

Figure 5E:
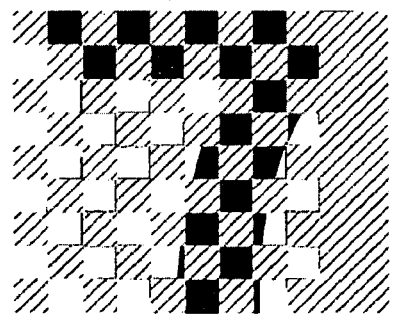
FIG. 5*e* shows the mask layer 520 and the pattern layer 510 superimposed in a second configuration.

FIG. 5e shows the mask layer 520 and the pattern layer 510 superimposed in a second configuration. To arrive at this second configuration, the mask layer has been displaced by the width of one cell or square to the left relative to the pattern layer from its starting point as shown in FIG. 5c. The mask layer fully obscures many of the shaded portions of the underlying pattern layer. The shaded portions of the underlying pattern layer that are not obscured form a visible pattern, which in the present example resembles the character "7".

While the above examples relate to monochrome patterns, a number of approaches may be envisaged enabling colour or shaded patterns. In patterns having a higher resolution, it may be appropriate to assign each cell a particular colour, such as a primary colour, in such a manner that the cells visible at a given time appear to the viewer to merge to form a particular colour, in a manner analogous to the formation of an image on a colour television set, but with two or more images interleaved in the manner described above.

Alternatively a coloured image may simply be broken into cells as described above with each cell retaining its original colouring, which may include a range of colours. This approach may be more appropriate in low resolution solutions.

Still further, embodiments comprising a plurality of different mask layers may be envisaged, each associated with a different actuating member. All the described principles can be easily generalized to coloured images, for example, by stacking images using the primary colours.

Countless other mask patterns may be envisaged. Still, further mask and pattern variants based on rotational rather than linear movements may be envisaged.

Figure 6A:
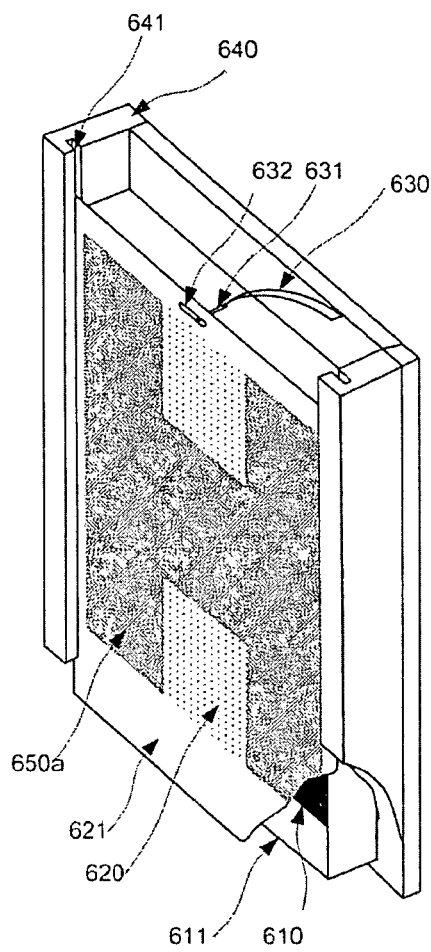
FIG. 6*a* shows the mechanism in a first configuration corresponding to a first ambient temperature.
Figure 6B:
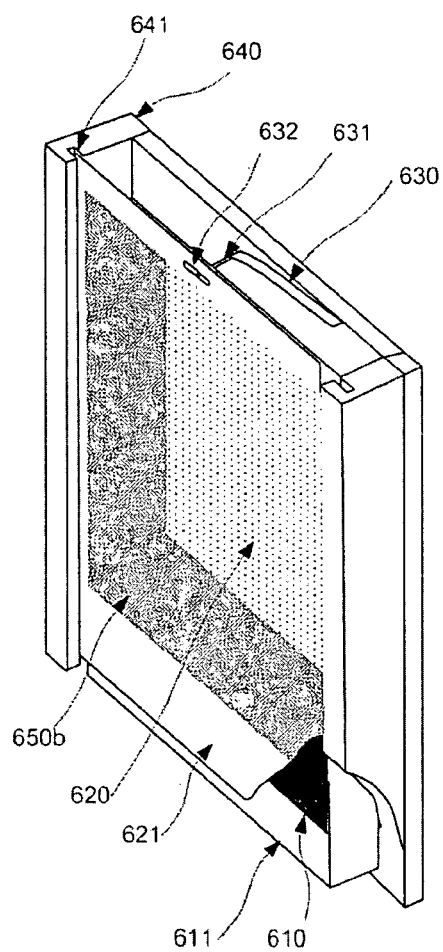
FIG. 6*b* shows the mechanism in a second configuration corresponding to a second ambient temperature.

FIGS. 6a and 6b shows a mechanism whereby the mask layer is moved relative to the pattern layer by the movement of an actuating member coupled thereto as a function of ambient physical conditions.

In particular, FIGS. 6a and 6b illustrate a fixed background film 611, with a printed pattern 610; a mobile foreground film 621, with a printed mask 620; a frame 640 holding the background film 611 in a fixed position and holding the foreground film 621 as movable along a fixed direction by means of a groove 641. FIGS. 6a and 6b also depict a temperature sensitive actuating member 630 between the frame 640 and the mobile foreground film 621, constituted by a material with a high dilatation factor such as a metallic material, a bimetallic strip or the like. As shown, the temperature sensitive member 630 is coupled to the foreground film 621 by means of a slot 632 in the foreground film 621 and a pin 631 fixed to the temperature sensitive member 630 and sliding in the slot 632.

The mask 620 printed on the back of the foreground film 621 and the pattern 610 on the front of the background film are such that they form altogether different images depending on their relative position as described above.

FIG. 6a shows the mechanism in a first configuration corresponding to a first ambient temperature. As shown, the mobile foreground film 621 sits low in the slot 641. By interaction of the mask layer 620 and the pattern layer 610, a first image 650a corresponding to a letter "H" is visible.

FIG. 6b shows the mechanism in a second configuration corresponding to a second ambient temperature. As shown, mobile foreground film 621 sits high in the slot 641, as a result of the temperature sensitive member 630 straightening out, for example, due to a lower ambient temperature. By interaction of the mask layer 620 and the pattern layer 610, a second image 650b corresponding to a letter "L" is visible, indicating the lower temperature.

Under different thermal conditions, dilation of the temperature sensitive member 630 will result into different pattern shifts, translates into different images.

The following principles may be applied in determining pattern layer and mask layer patterns. We use the following convention for pixels: 0=black, 1 transparent.

The mask layer G is constituted by pixels $G(i,j)$ with the following rules:

Probability$[G(i,j)=0]=1/2$ (averaging into a grey pattern)

The size of the pixel is small with respect to the pitch of the image.

The dilatation between temperature T1 and T2 moves pixel $(i,j)$ onto pixel $(i+I, j+J)$ $G(i+I, j+J) = 1 - G(i,j) = \overline{G(i,j)}$ An easy example is to define a pixel size such that $I=J=1$, and $G(i,j) = \mathrm{mod}(i-j, 2)$. The pattern layer B can be constituted by pixels combining two images $P_1$ and $P_2$: $B(i,j) = P_1(i,j)*G(i,j) + P_2(i,j)*\overline{G(i,j)}$. Under temperature T1, the resulting image is $B(i,j)*G(i,j) = P_1(i,j)*G(i,j)$, that is $P_1$ with a background that averages to grey. Under temperature T2, the resulting image is $B(i,j)*\overline{G(i,j)}=P_2(i,j)*\overline{G(i,j)}$, that is $P_2$ with a grey background.

For a certain temperature range the display will be physically in transition between the two 'essential' positions shown in FIGS. 6a and 6b, respectively. This may be undesirable in some applications since it may result in the visible display remaining in an intermediate, transitional position for a long time (i.e. when the ambient conditions measured happen to fall in an intermediate range).

Figure 7:
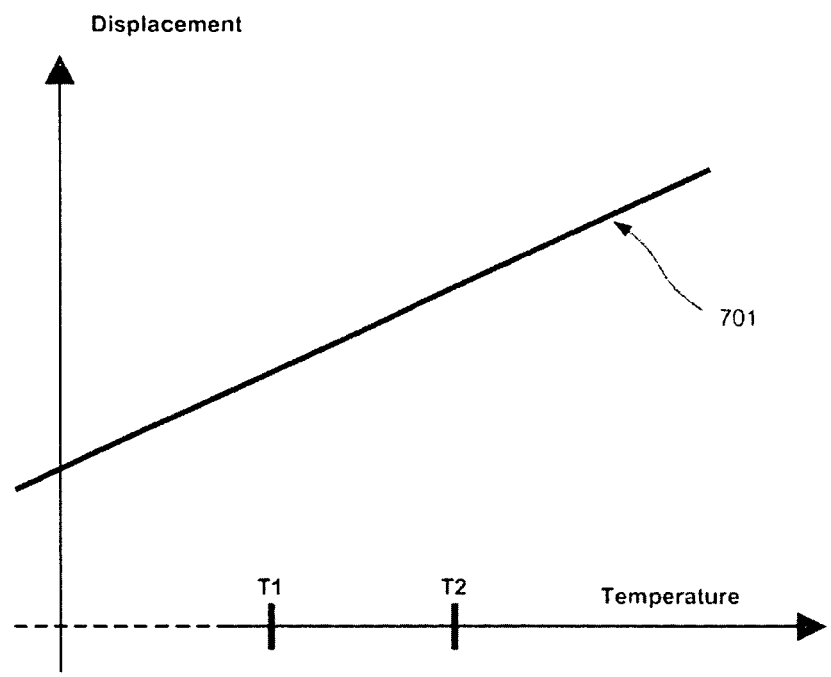
FIG. 7 shows a linear temperature response.

FIG. 7 shows a linear temperature response. In the case where the device is used to measure temperature values, for example, wherein the movement of the mask layer with respect to the pattern layer is linear as a function of temperature, the visible pattern will be in an intermediate state for a considerable range of temperature values. Such a situation is shown in FIG. 7, where the points T1 and T2 indicate points on the horizontal temperature axis at which the display device attains the 'essential' positions shown in FIGS. 6a and 6b, respectively, and the constant gradient line 701 represents the displacement of the mask layer with respect to the pattern layer as a function of temperature.

Figure 8:
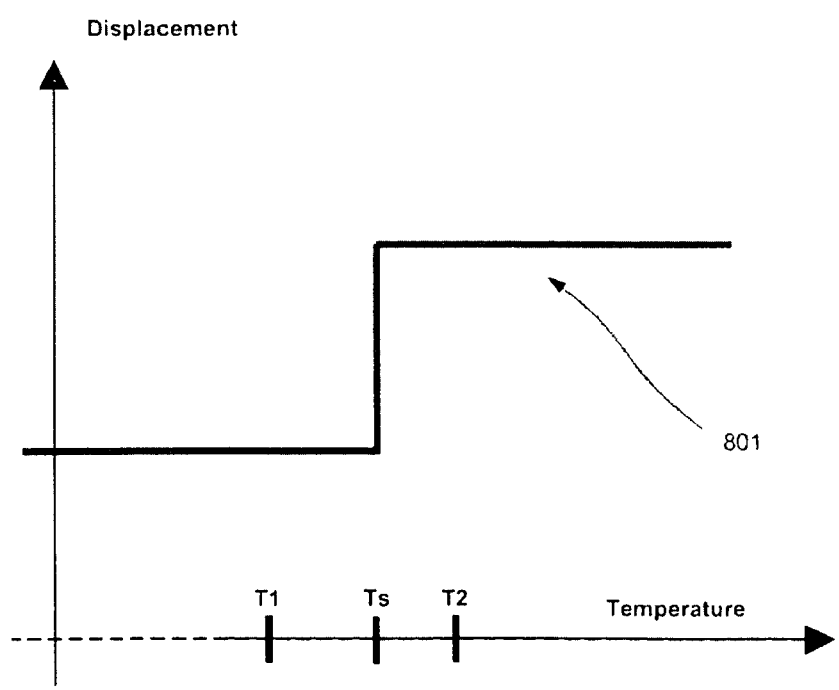
FIG. 8 shows an improved displacement response.

Improved displacement responses may be envisaged. FIG. 8 shows an improved displacement response. FIG. 8 is the same as FIG. 7, except that the displacement response line 801 exhibits a constant displacement value corresponding, for example, to the relationship of 6a, from a zero temperature to a threshold temperature value Ts situated between T1 and T2, whereafter the displacement response line 801 exhibits a second constant displacement value corresponding, for example, to the relationship of 6b. Thus, with this ideal response the mask layer and pattern layer may assume one of two distinct positions only.

A number of methods of approximating such a situation may be envisaged, which can for example transform an analogue temperature measure to an ON/OFF measure. One example is the type of thermostat which can turn electrical heating on and off. Such a mechanical device can be constructed so as to operate without any use of electricity.

FIG. 9 illustrates the function of a thermostat in switching layer positions. As shown, the illustration shows 'amplification' of the temperature measure using a resilient multistable member 933. A temperature sensitive actuating member 930, which becomes longer or shorter as a function of temperature is fixed at one end (e.g. to the device frame 940), and coupled at the other to the resilient multistable member 933 at a point along its length. One end of the resilient multistable member 933 is fixed (e.g. to the device frame 940), and the other is coupled to the mask layer 921, which as described for example with respect to FIG. 6, is free to move in one axis.

Figure 9A:
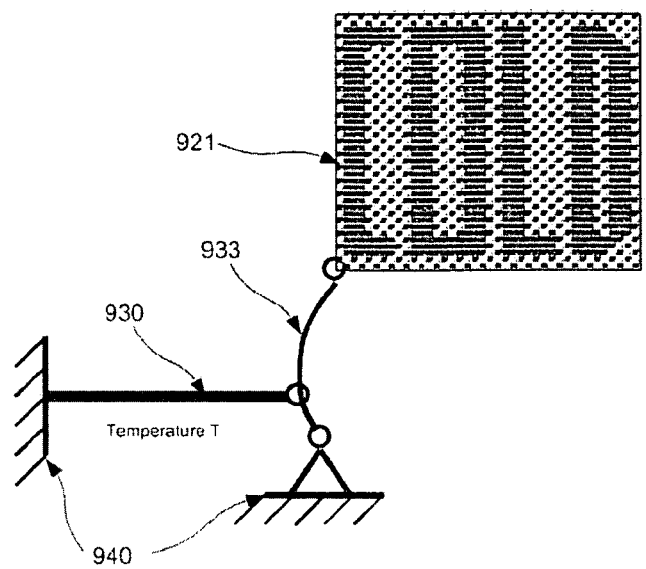
FIGS. 9*a* and 9*b* illustrates the function of a thermostat in switching layer positions.
Figure 9B:
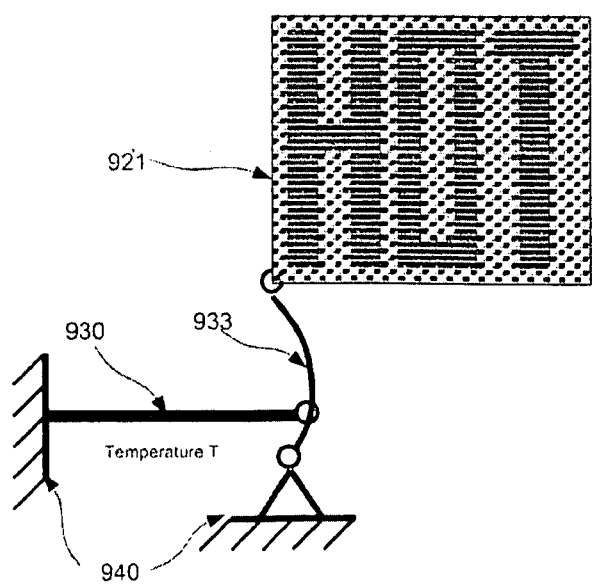

The resilient multistable member 933 is compressed between its fixed extremity and the mask layer 921 so as to be forced to adopt a bowed configuration. The point at which the temperature sensitive actuating member 930 is coupled to the resilient multistable member 933 is closer to the fixed extremity than to the extremity coupled to the mask layer 921. By means of such a configuration, the resilient multistable member 933 may flip between two stable positions (i.e. bowed to the right as shown in FIG. 9a, and bowed to the left as shown in FIG. 9b), so as to amplify small changes in the length of the temperature sensitive actuating member 930. Thus, as shown in FIG. 9a, at a low temperature the temperature sensitive actuating member 930 will shorten, causing the mask layer 921 to shift to the right, so as to expose the parts of the underlying pattern layer such as to display the symbol "cold". As shown in FIG. 9a, meanwhile, at a high temperature the temperature sensitive actuating member 930 will lengthen, causing the mask layer 921 to shift to the left, so as to expose the parts of the underlying pattern layer such as to display the symbol "hot".

In such an embodiment the actuating member may be considered to be coupled to the mask layer by a resilient multistable member configured to bias the mask layer to the first position and to the second position.

Figure 10:
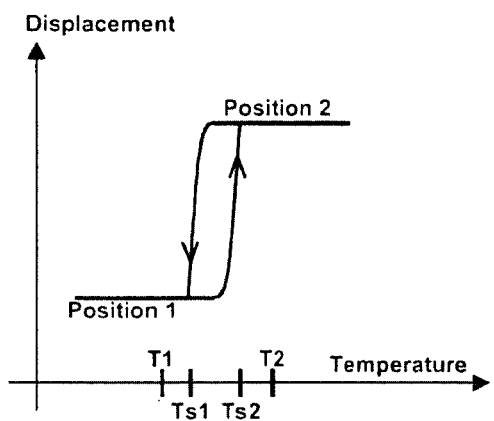
FIG. 10 shows a realistic curve taking friction into account and taking into account that the force of the spring varies with its deformation.

It will be appreciated that such a thermostat mechanism may exhibit hysteresis, in other words the temperature at which the devices flips from left to right will not be the same as that at which it flips from right to left. This phenomenon is shown in FIG. 10. FIG. 10 shows the response of FIG. 8 modified to show the effect of hysteresis. As shown, the threshold temperature Ts2 applies when transitioning from position 1 to position 2 and the threshold temperature Ts1 applies when transitioning from position 2 to position 1, with Ts1 being below Ts2, and both values between T1 and T2.

For example, we may imagine that if in position 1 the display shows COLD and the temperature moves upwards, at temperature 25 degrees, the display switches to HOT. When the display shows HOT and the temperature decreases, at temperature 19 degrees, the displays switched to COLD.

FIG. 10 shows a realistic curve taking friction into account and taking into account that the force of the spring varies with its deformation.

By adjusting the amplification (the length of the resilient multistable member 933) versus the spring constant, the characteristics shown above in FIG. 10 may be tuned to achieve good results close to the ideal of FIG. 8.

Figure 11:
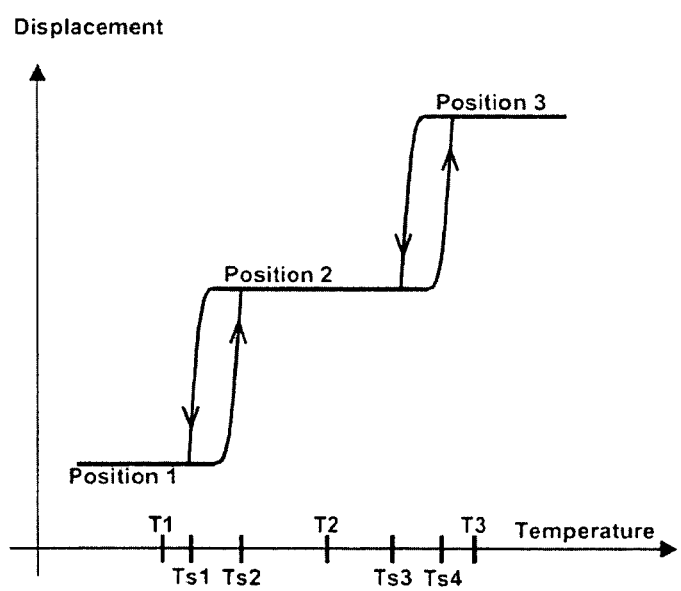
FIG. 11 illustrates a graph depicting a double hysteresis pattern.

However, it is possible to construct a mechanical device so it truly has only two positions, like those used to turn electrical heating on and it will be appreciated that these considerations may have implications for the implementation of the embodiments providing more than two positions displaying meaningful symbols such as described with regard to of FIG. 4. If an implementation along the lines described with respect to FIG. 9 were attempted, it would be necessary to provide an actuating mechanism exhibiting a double hysteresis. FIG. 11 shows a double hysteresis pattern. FIG. 11 shows the response of FIG. 10 modified to show three positions with interceding hysteresis loops. Position 1 corresponds to a low temperature t1, Position 2 corresponds to a medium temperature t2 and Position 3 corresponds to a high temperature t3. As shown, the threshold temperature Ts2 applies when transitioning from position 1 to position 2, and the threshold temperature Ts1 applies when transitioning from position 2 to position 1, with Ts1 being below Ts2, and both values being between T1 and T2. Meanwhile Ts4 applies when transitioning from position 2 to position 3, and the threshold temperature Ts3 applies when transitioning from position 3 to position 2, with Ts3 being below Ts4, and both values being between T2 and T3.

According to a further embodiment there is disclosed a display apparatus comprising a mask layer comprising transparent portions and opaque portions, the mask layer being superimposed over a pattern layer comprising light portions and dark portions, wherein the mask layer can be moved relative to the pattern layer between a first position whereby certain portions on the pattern layer are selectively obscured, and a second position whereby other portions on the pattern layer are selectively obscured, wherein the mask layer is moved relative to the second level by the movement of an actuating member coupled thereto as a function of ambient physical conditions.

The present invention can take the form of an entirely hardware embodiment, an entirely software embodiment or an embodiment containing both hardware and software elements. In a preferred embodiment, for example, the invention can be implemented in software, which includes, but is not limited to, firmware, resident software, microcode, etc. In particular, whilst the embodiment of FIG. 6 is purely mechanical, the skilled person will appreciate that various combinations of electrical and mechanical components are possible. For example, electronic sensors may be used to determine ambient conditions and an electronically controlled transducer cause the desired movement in the actuator member. Embodiments may be realized by means micromachining, for example, as part of Micro-Electro-Mechanical Systems technology (MEMS).

What is claimed is:

1. A display apparatus, comprising:
    a mask layer G comprising portions having a first light transmission characteristic and portions having a second light transmission characteristic for shading; and
    a pattern layer B, wherein said mask layer is superimposed over said pattern layer comprising portions of a first light emission characteristic and portions of a second light emission characteristic, the portions of the first light emission characteristic and the portions of the second light emission characteristic defining pixels for a plurality of images encoded on the pattern layer, the pattern layer combining a first set of pixels P1 for a first image and a second set of pixels P2 for a second image, wherein the mask layer can be moved relative to said pattern layer between a first position, whereby certain portions on said pattern layer are selectively obscured, and a second position whereby other portions on said pattern layer are selectively obscured, wherein said mask layer is moved relative to said pattern layer by a movement of an actuating member coupled thereto as a function of ambient physical conditions;
    wherein a pixel at a position i, j of the pattern layer B is determined according to the formula:

$$B(i,j)=P1(i,j)*G(i,j)+P2(i,j)*(1-G(i,j)),$$

wherein G(i,j) is a value of pixel at position i,j in the mask layer G.

2. The display apparatus of claim 1 wherein said first light transmission characteristic is a transmittance of greater than 80% at a first visible light wavelength, and said second light transmission characteristic is a transmittance of less than 20% at said first visible light wavelength.

3. The display apparatus of claim 1 wherein said first light emission characteristic is a reflectivity of greater than 80% at a first visible light wavelength, and said second light transmission characteristic is different to said first light emission characteristic.

4. The display apparatus of claim 1 wherein said portions include a first light transmission characteristic and portions having a second light transmission characteristic define a regular pattern.

5. The display apparatus of claim 4 wherein said portions having a first light transmission characteristic and portions having a second light transmission characteristic define a chequered pattern.

6. The display apparatus of claim 1 wherein said ambient physical conditions comprise temperature, and the movement of said actuating member comprise a thermal expansion or contraction thereof.

7. The display apparatus of claim 1 wherein said first position said portions on said pattern layer that are not obscured are visible as one or more meaningful symbols.

8. The display apparatus of claim 7 wherein said second position said portions on said pattern layer that are not obscured are visible as one or more meaningful symbols.

9. The display apparatus of claim 8 wherein said ambient physical conditions comprise temperature and wherein said portions on said pattern layer that are not obscured are visible as a message or symbol relating to said ambient physical conditions.

10. The display apparatus of claim 1 wherein said actuating member is coupled to said mask layer by a resilient multistable member configured to bias said mask layer to said first position and to said second position.

11. A display apparatus, comprising:
    a mask layer G comprising portions having a first light transmission characteristic and portions having a second light transmission characteristic; and
    a pattern layer B, wherein said mask layer is superimposed over said pattern layer comprising portions of a first light emission characteristic and portions of a second light emission characteristic, the portions of the first light emission characteristic and the portions of the second light emission characteristic defining pixels for a plurality of images encoded on the pattern layer, the pattern layer combining a first set of pixels P1 for a first image and a second set of pixels P2 for a second image, wherein the mask layer can be moved relative to said pattern layer between a first position, whereby certain portions on said pattern layer are selectively obscured, and a second position whereby other portions on said pattern layer are selectively obscured, wherein said mask layer is moved relative to said pattern layer by a movement of an actuating member coupled thereto as a function of ambient physical conditions and wherein said portions include a first light transmission characteristic and portions having a second light transmission characteristic define a regular pattern;
    wherein a pixel at a position i, j of the pattern layer B is determined according to the formula:

$$B(i,j)=P1(i,j)*G(i,j)+P2(i,j)*(1-G(i,j)),$$

wherein G(i,j) is a value of pixel at position i,j in the mask layer G.

12. The display apparatus of claim 11 wherein said first light transmission characteristic is a transmittance of greater than 80% at a first visible light wavelength, and said second light transmission characteristic is a transmittance of less than 20% at said first visible light wavelength.

13. The display apparatus of claim 11 wherein said first light emission characteristic is a reflectivity of greater than 80% at a first visible light wavelength, and said second light transmission characteristic is different to said first light emission characteristic.

14. The display apparatus of claim 11 wherein said portions having a first light transmission characteristic and portions having a second light transmission characteristic define a chequered pattern.

15. The display apparatus of claim 11 wherein said ambient physical conditions comprise temperature, and the movement of said actuating member comprise a thermal expansion or contraction thereof.

16. The display apparatus of claim 11 wherein said first position said portions on said pattern layer that are not obscured are visible as one or more meaningful symbols.

17. The display apparatus of claim 16 wherein said second position said portions on said pattern layer that are not obscured are visible as one or more meaningful symbols.

18. A display apparatus, comprising:
a mask layer G comprising portions having a first light transmission characteristic and portions having a second light transmission characteristic; and
a pattern layer B, wherein said mask layer is superimposed over said pattern layer comprising portions of a first light emission characteristic and portions of a second light emission characteristic, the portions of the first light emission characteristic and the portions of the second light emission characteristic defining pixels for a plurality of images encoded on the pattern layer, the pattern layer combining a first set of pixels P1 for a first image and a second set of pixels P2 for a second image, wherein the mask layer can be moved relative to said pattern layer between a first position, whereby certain portions on said pattern layer are selectively obscured and a second position whereby other portions on said pattern layer are selectively obscured wherein said mask layer is moved relative to said pattern layer by a movement of an actuating member coupled thereto as a function of ambient physical conditions, wherein said ambient physical conditions comprise temperature, the temperature including a first temperature value T1 and a second temperature value T2, wherein the movement of said actuating member comprise a thermal expansion or contraction thereof and wherein said first position said portions on said pattern layer that are not obscured are visible as one or more meaningful symbols;
wherein dilation between T1 and T2 causes a pixel at a position i, j of the mask layer G to move to a position i+I, j+J, wherein the pixel at the position i,j of the mask layer G is determined according to the formula:

$$G(i+I, j+J) = 1 - G(i,j)$$

and wherein a pixel at the position i,j of the pattern layer B is determined according to the formula:

$$B(i,j) = P1(i,j) * G(i,j) + P2(i,j) * (1 - G(i,j)).$$

19. The display apparatus of claim 18 wherein:
said second position said portions on said pattern layer that are not obscured are visible as one or more meaningful symbols; and
said ambient physical conditions comprise temperature and wherein said portions on said pattern layer that are not obscured are visible as a message or symbol relating to said ambient physical conditions.

20. The display apparatus of claim 18 wherein said actuating member is coupled to said mask layer by a resilient multistable member configured to bias said mask layer to said first position and to said second position.

* * * * *